(12) United States Patent
Castro et al.

(10) Patent No.: US 12,212,362 B2
(45) Date of Patent: Jan. 28, 2025

(54) APPARATUS AND METHODS FOR MONITORING OPTICAL NETWORKS

(71) Applicant: Panduit Corp., Tinley Park, IL (US)

(72) Inventors: Jose M. Castro, Naperville, IL (US); Yu Huang, Orland Park, IL (US); Bulent Kose, Burr Ridge, IL (US); Asher S. Novick, New York, NY (US); Kevin A. Marley, Joliet, IL (US); Brian L Kelly, Oak Forest, IL (US)

(73) Assignee: Panduit Corp., Tinley Park, IL (US)

( * ) Notice: Subject to any disclaimer, the term of this patent is extended or adjusted under 35 U.S.C. 154(b) by 2 days.

(21) Appl. No.: 18/072,804

(22) Filed: Dec. 1, 2022

(65) Prior Publication Data

US 2023/0179302 A1 Jun. 8, 2023

Related U.S. Application Data

(60) Provisional application No. 63/286,774, filed on Dec. 7, 2021.

(51) Int. Cl.
*H04B 10/075* (2013.01)
*H04B 10/2581* (2013.01)
*H04B 10/61* (2013.01)

(52) U.S. Cl.
CPC ....... *H04B 10/2581* (2013.01); *H04B 10/612* (2013.01); *H04B 10/615* (2013.01)

(58) Field of Classification Search
CPC .................................................... H04B 10/075
See application file for complete search history.

(56) References Cited

U.S. PATENT DOCUMENTS

| 4,671,653 | A | 6/1987 | So et al. | |
|---|---|---|---|---|
| 5,067,786 | A | 11/1991 | Hawkins et al. | |
| 5,708,499 | A | 1/1998 | Baden et al. | |
| 8,976,344 | B2 | 3/2015 | Liang et al. | |
| 2002/0146206 | A1* | 10/2002 | Aleksoff | G02B 6/4215 385/48 |
| 2013/0343748 | A1* | 12/2013 | Benou | H04B 10/07957 398/29 |
| 2016/0349144 | A1 | 12/2016 | Guimond | |
| 2021/0297757 | A1* | 9/2021 | Castro | G02B 6/3556 |

FOREIGN PATENT DOCUMENTS

EP 0548053 A2 6/1993

* cited by examiner

*Primary Examiner* — Shi K Li
(74) *Attorney, Agent, or Firm* — Christopher K. Marlow; Christopher S. Clancy; James H. Williams

(57) ABSTRACT

An apparatus having input and output ports using a plurality of optical connector adapters, wherein the fiber connections can follow a specific mesh pattern has a plurality of fibers inside the apparatus. The fibers pass through at least one mandrel and are designed to produce a leakage in the transmitted light from each fiber of least −30 dBm, wherein the fiber buffer of fibers around the mandrel are partially stripped in at least one section. The apparatus also has an imaging system consisting of at least a lens, camera sensor and an optical filter are placed in proximity to the fiber striped section wherein the optical filter has spectral properties tuned or partially tuned to the operational wavelength of the network and the optical filter is placed in the light path before the camera sensor.

7 Claims, 6 Drawing Sheets

Details of the imaging system.

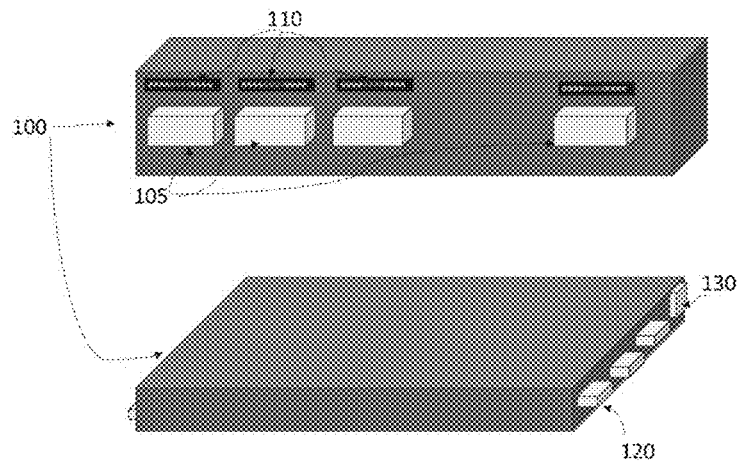
Figure 1 Schematic of embodiments
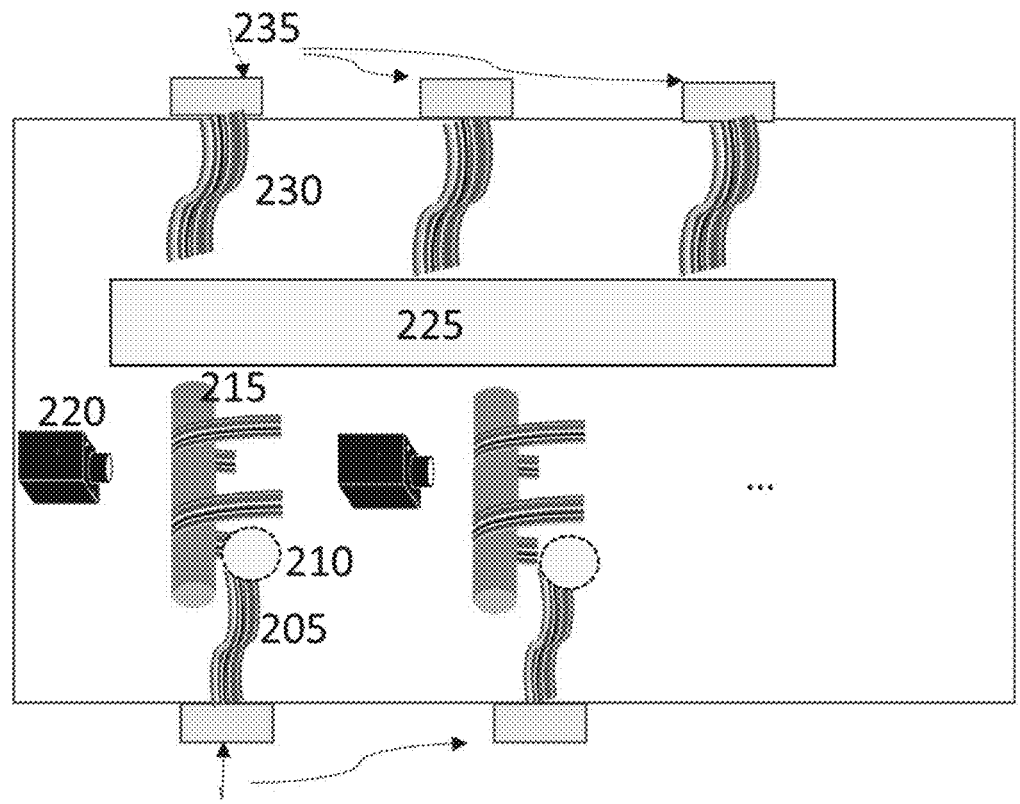
Figure 2 Schematic of the enclosure configuration

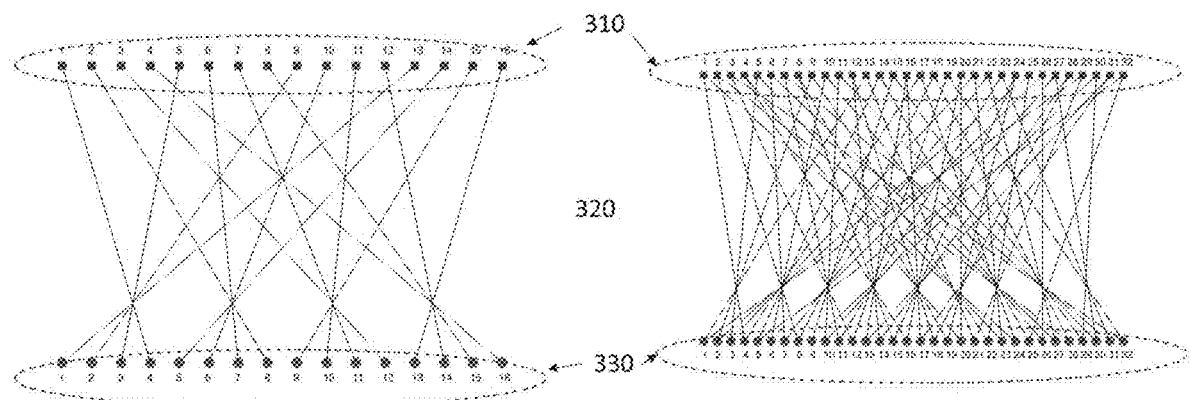
Figure 3 Mesh network in a box (spine ports rectangles, leaf port circles)
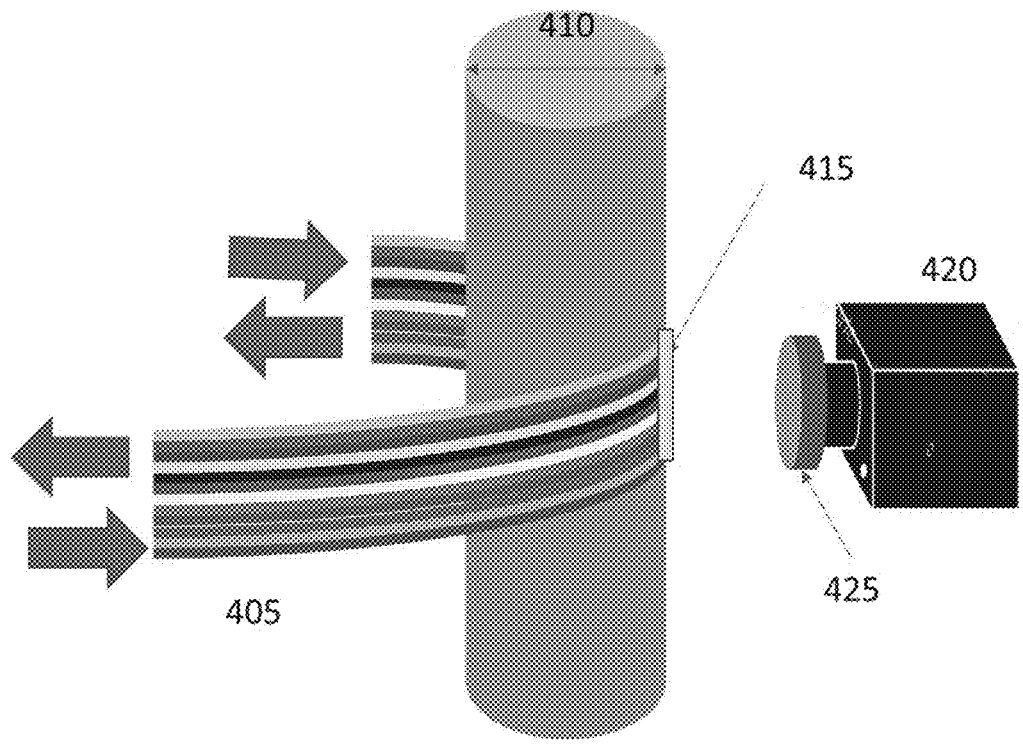
Fig. 4 Details of the imaging system.

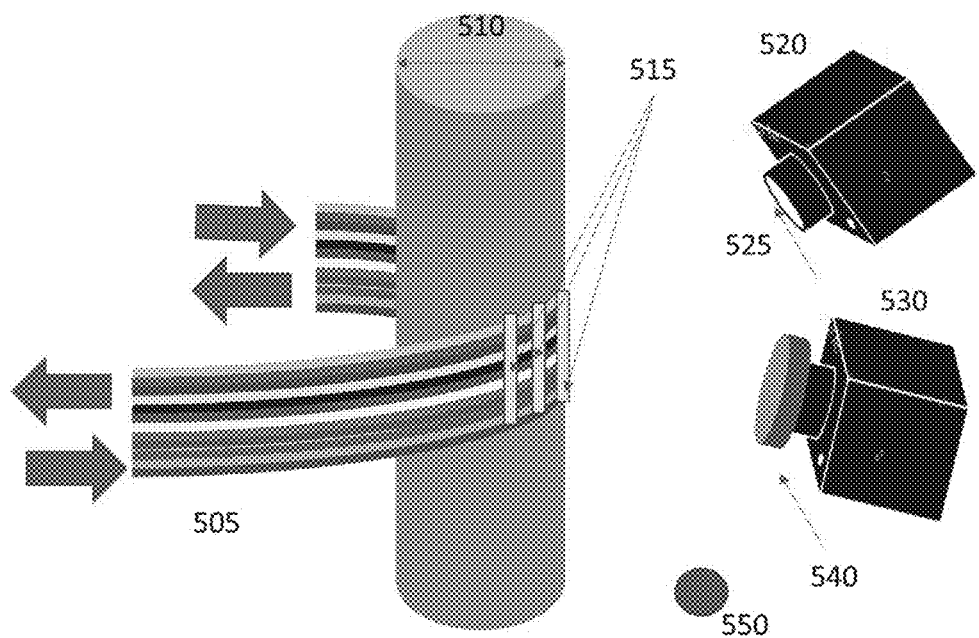
Fig. 5 Details of the imaging system.
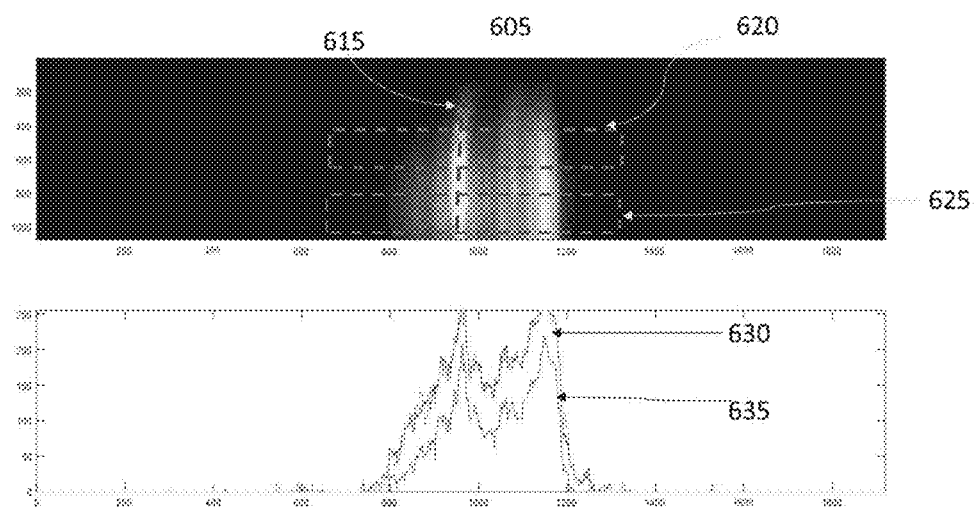
Fig. 6 Method for identifying fibers

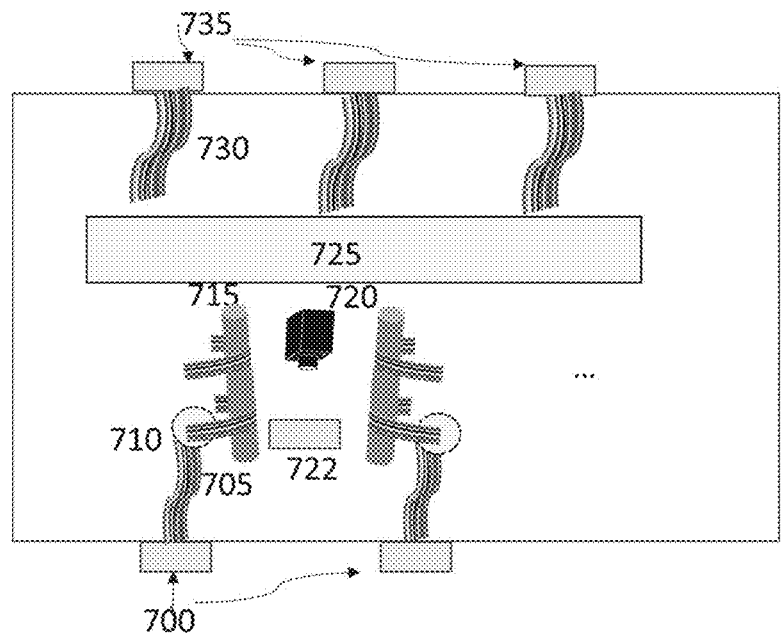
Figure 7  Schematic of the enclosure configuration
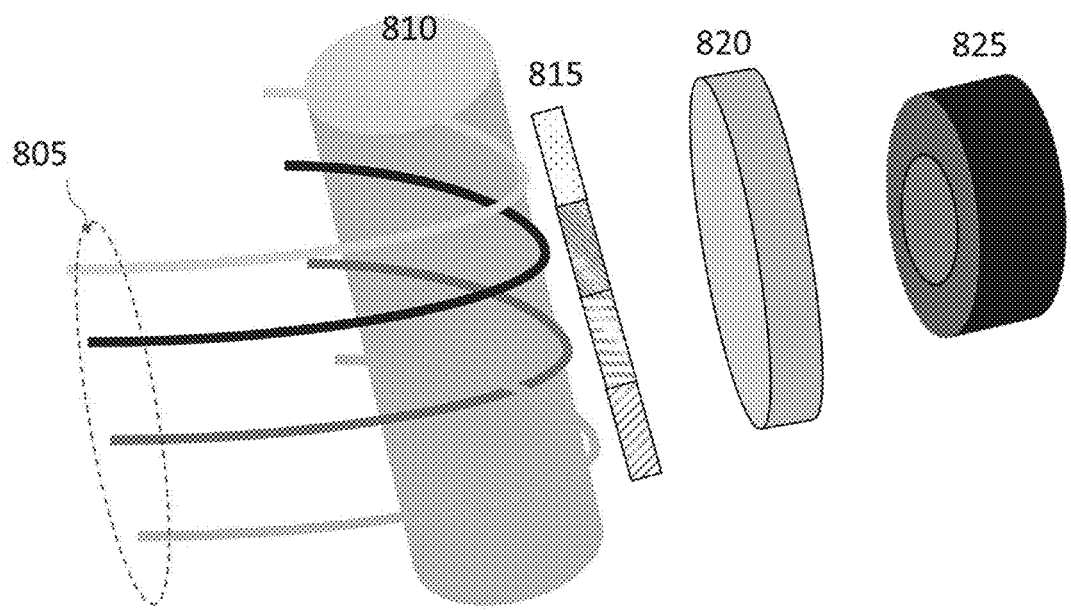
Fig. 8

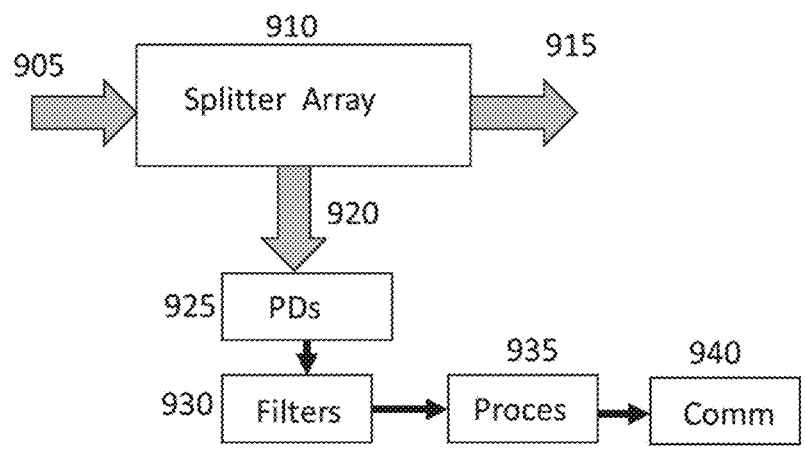
Fig. 9
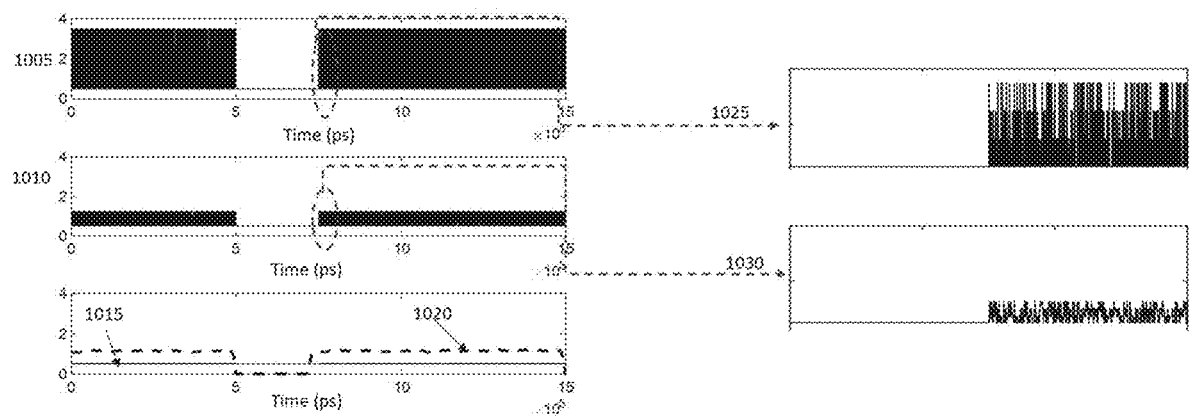
Fig 10 Low power monitoring of activity per channel

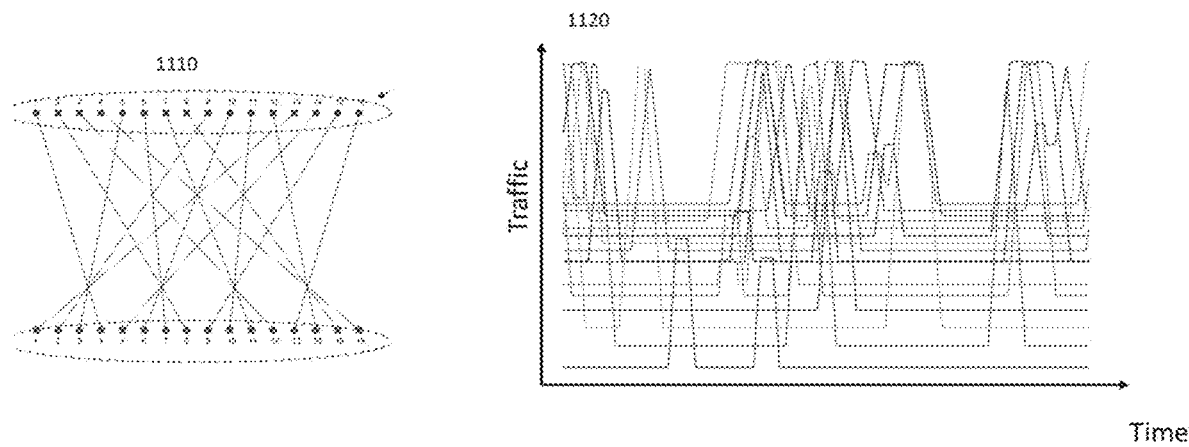
Fig. 11 Monitoring of Mesh network

APPARATUS AND METHODS FOR MONITORING OPTICAL NETWORKS

FIELD OF INVENTION

The present invention relates to the field of network optical interconnection and more specifically to apparatus and methods to monitor active optical interconnections, data transmission traffic integrity in datacenters or local area networks (LANs).

The apparatus and methods disclosed herein, provides monitoring functionalities without significant increase of optical channel losses, and can be installed in a structured cabling system. The apparatus can perform various functions such as network monitoring, network mapping, asset tracking, and reliability, among others.

BACKGROUND

To optimize datacenter network performance in terms of asset utilization, effective packet transmission rate, and latency, it is desirable to monitor the utilization of the network links and the associated traffic. Current monitoring methods typically utilize the same switches that redirect the packets in the network or employ optical tap devices connected to less expensive switches. Those approaches using network switches for monitoring have multiple disadvantages, including increased latency and inefficiencies in monitoring complex topologies that involves connections through many switches. Also, since the monitoring already occurs after optical/electrical conversion it does not detect variation in optical power that can indicate potential failures of the laser, or additional connections within the network topology. In addition, using distributed optical taps requires more optical connections and consequently, introduces larger excess loss.

Here we disclose an apparatus and method thereof for monitoring optical link usage and traffic more efficiently. In this approach a centralized apparatus is utilized where all the interconnections can be monitored together introducing minimum insertion loss.

SUMMARY

An apparatus having input and output ports using a plurality of optical connector adapters, with internal fibers connecting the input and output optical ports, wherein the fiber connections can follow a specific mesh pattern has a plurality of fibers inside the apparatus. The fibers pass through at least one mandrel and are designed to produce a leakage in the transmitted light from each fiber of least −30 dBm, wherein the fiber buffer of fibers around the mandrel are partially stripped in at least one section. The apparatus also has an imaging system consisting of at least a lens, camera sensor and an optical filter are placed in proximity to the fiber striped section wherein the optical filter has spectral properties tuned or partially tuned to the operational wavelength of the network and the optical filter is placed in the light path before the camera sensor and electronic circuits are placed to process images from the camera and transmit them using a cable connected to the device.

BRIEF DESCRIPTION OF THE DRAWINGS

FIG. 1 shows a front and side isometric view of a Type I embodiment of the present invention.

FIG. 2 shows a schematic view of the internal structure of the enclosure of FIG. 1.

FIG. 3 shows two mesh network topologies that can be used with the present invention.

FIG. 4 shows details of a first embodiment of an imaging system that can be used with the present invention.

FIG. 5 shows details of a second embodiment of an imaging system that can be used with the present invention.

FIG. 6 shows an example of a detection method that can be used with the present invention.

FIG. 7 shows a schematic view of the internal structure of another embodiment of the present invention.

FIG. 8 shows an embodiment of an imaging system that can be used with a Type II embodiment of present invention.

FIG. 9 shows a schematic of a Type III embodiment of the present invention.

FIG. 10 shows a simulated operation of the disclosed device.

FIG. 11 shows an example for this application and a partial view of an arbitrary network architecture with two levels of switches.

DETAILED DESCRIPTION OF INVENTION EMBODIMENTS

Three types of embodiments as shown here as examples of the disclosed invention. In the first two embodiments (type I, II) we detect light escaping from slightly bent fibers inside an enclosure. In the third embodiment (type III) we use optical taps, i.e., biconical tapered or thin film filters with very small taps ratios. In each of the embodiments one can utilize cameras or array sensors and can operate at wavelengths longer than 1 micron.

For type I and II embodiments the degree of light leakage is controlled depending on the type of fiber, i.e., multimode fiber (MMF) or single-mode fiber (SMF), and the degree of bend insensitivity, e.g., category G.657 A1, A2/B2, B3 for SMF. The degree of bend required depends on the manufacturer design of the fiber, i.e., refractive index profile and trench depression, that provide enough leakage for detection with minimum insertion loss.

Type I Embodiments

Two views of the first embodiment are shown in FIG. 1. In this figure, the front face of the enclosure is represented by 100. Several input optical ports, labeled 105, can be placed at the front face of the device. A series of displays, 110, such as LCDs, OLEDs, electronic paper, or LEDs, may be used to indicate which fibers are transmitting light. The output optical ports, represented by 120, can be placed at the back of the devices. There are N input optical ports and M output optical ports using adapters/connectors, such as LC, SC or MPO. At least one electrical port, i.e., RJ45, is used to provide power, data, and control signals. A wireless transmitter inside the box is optional.

FIG. 2 shows the internal structure of the disclosed embodiments. In this figure, the input and optical ports are connected to internal fibers arranged to support one or more structured cabling topologies. In accordance with the present invention, one or more of the internal fibers, for example 205 and or 230 can be selected to be bend insensitive (BI) fibers or non-BI fiber. Depending on the optical channel, the fibers can be multimode fibers (MMFs), i.e., OM3, OM4 or OM5, or single-mode fiber (SMF), i.e., ITU-T G.652.D SMF.

A mandrel, 215, having a radius sufficiently small to produce a radiated optical signal that can be detected by a sensor or camera when the optical fiber is wrapped around said mandrel is used to perform a monitoring function, while minimizing the bending loss introduced into the optical link. One exemplary metric that can be use is the ratio of the radiated signal power in units of dBm as detected by the camera versus the loss at the fiber in units of dB. It has been demonstrated that using a fiber selected for this application, a −30 dBm peak power signal can be detected by a camera with only a 0.02 dB insertion loss added to the link. A camera with a wide field of view lens, i.e., a plastic fish eye lens can be used to detect multiple fibers at the same time.

For illustration purposes, the fibers bent around the mandrel device shown in the figure have colored buffer coatings. However, to improve the signal to noise ratio (SNR) at the camera, it is advantageous to remove the buffer in certain sections or use bare fibers without a buffer coating.

After the mandrel fibers can be directly connected to the external ports, or cross-connected to perform network mesh topologies, 225 to centralize the network interconnecting cabling. An example of two logical topologies is shown in FIG. 3. Complex mesh configurations for spine-leaf architecture can be collapsed in a box as shown in RS (RJPI-MESH) providing significant advantages for reducing latency and reliability of the network. In the present invention, it is realized that it is advantageous to monitor the signals, i.e., optical power and traffic, in the enclosure, since all the connections are accessible for the multiple switches of the network.

FIG. 4 provides details of the imaging system. For illustration purposes, we illustrate a ribbon comprising multiple fibers, 405, with transmitting and receiving fibers in said ribbon are partially wrapped around mandrel, 410, specially designed to optimize the light radiation towards the camera, 420. In this scenario, the buffers in the regions shown in 415 are striped to improve the image SNR. The mandrel can include grooves in the surface to accommodate the fiber and provide an additional fiber separation which can improve the identification of the fibers. An optical filter, 425, i.e., thin film filter or a dichroic filter partially tuned to the operational wavelength can be used to improve SNR.

Another embodiment, shown in FIG. 5, utilizes two cameras to capture visible light and the infrared light radiated from the fiber (operational wavelength.) One camera, 520, has an optical filter similar to 425, and the other camera, 525, uses a filter transparent to visible light. The first camera focuses on the regions where the buffers were removed, 515. The function of the second camera, 525, is to better identify the position of the fibers based on the buffer color coding on those sections where the coatings were not removed and therefore relax the mechanical tolerance of the device. Moreover, when the position or trajectory of each fiber around the mandrel is known, the power radiated by each fiber can be accurately averaged improving the SNR.

FIG. 6, shows an example of the detection method for a ribbon containing 12 fibers, where only 4 fibers are illuminated as shown. In this figure, 615 represent the line or curve of one of the fiber. The integration regions used in this example are labeled 620 and 625. These regions follow the trajectory of the fiber in the mandrel. The profiles shown in 630 and 635 represent the sum of the power radiated along the curves containing the fibers. Using these profiles, fibers that transmit power in the ribbon can be identified.

Another embodiment described here, is similar to the one shown in FIG. 5. However, it uses an optical filter, 425, having relatively low attenuation in the visible spectrum. Therefore, using an internal visible optical source to illuminate the fibers (power larger than the IR power leaked), the camera can capture both visible and IR light. For example, by turning the illumination source on or off, the visible image can be made stronger than the IR image or vice versa. This embodiment provides the same advantage described in the previous embodiment shown in FIG. 6, but uses only one camera.

Yet another embodiment shown in FIG. 7 utilizes mirrors to optimize the use of the cameras in the enclosure. In this FIG. 722 directs the light from two mandrels to the same camera.

Embodiments Type II: Using LCD Films and Detectors

Previous embodiments can be implemented using CMOS cameras for light in the 850 nm-1000 nm range. However, for SMF applications, where the operational wavelengths are typically longer than 1250 nm, the imaging method requires InGaAs, Ge, or other materials that increase the camera's responsivity, but this comes at a significant increase in cost.

To reduce cost, the second type of embodiment, shown in FIG. 8, using single photodetectors, 825, instead of a camera and a time multiplexing scheme to selectively measure the light of the fibers near the photodetector.

A lens or non-imaging collector, 820, is used to direct the light from several fibers to photodetector, 825. A set of LCD films, 815, in an array or matrix configuration is placed over the fibers to be measured. These LCD films, are used for many other applications and therefore, are relatively inexpensive and have very low power consumption.

The method requires that during operation, sections of the film are selectively attenuated to block the light for all the fibers with exception of the one being measured.

Embodiments Type III: Using Splitter and Detectors

Previous embodiments using cameras and/or large area (high sensitive) photo-detectors, do not have response times fast enough to detect if data is being transmitted. These detectors only measure the average optical power of the signals but cannot discriminate discrete data bits.

In the present invention we disclose methods and embodiments that can not only detect whether the fiber is lit, but whether or not the fiber is transmitting digital traffic. FIG. 9 shows a schematic of the device. A fiber or an array of fibers (905) are connected to optical splitters (910). The splitter(s) can be discrete components using biconical-tapper waveguides or thin films optical filters. Alternatively, it can use an array of splitters implemented in photonic light circuits. The split ratio is defined as the power in the transmitting fibers, (915) to the power in the tap fibers, 920. The fibers in 915 are connected to the optical network. Splitting ratios of 95/5 or higher are preferred to minimize the loses of the transmitted signals. A set of discrete photodetectors, or an array of integrated photodetectors, 925, are connected to the tap fibers, 920. The signals of the PDs are amplified and pass through a series of configurable or passive electrical filters, 930. When using configurable electrical filters, such as continuous time linear equalizer (CTLE), the pass-band of the filters can be tuned to the data rate of the applications. The RMS AC and DC signals from 930 are processed and monitored in 935. For less expensive applications, where there is no need to decode each data symbol, it is possible to estimate and monitor the RMS of the AC signal. Those parameters can provide an indication of channel traffic without decoding the data. Since the fiber connection can be identified and mapped, the port sender and port receiver can be recorded.

FIG. 10 shows a simulated operation of the disclosed device using PAM-4 signals. The transmitted data after splitter (915) is shown in 1005. A magnification window of the tapped signal after the filter 930 is shown in 1010. A magnification window on that signal is showing in 1025.

Methods and Applications

Methods and apparatus for cassettes, optical taps enclosures, mesh network enclosures, cross-connect and patch panels with optical monitoring capabilities were disclosed.

Since the embodiments according to the present invention can be placed at critical connection points within the network, i.e., mesh network, they can be efficiently used to monitor traffic, link usage, and laser power among many other parameters. Therefore, several functionalities can be provided without tasking other expensive components in the network, such as spine and leaf switches. Example of those functionalities are listed below:

Assets Management: the mapping of ports to network paths, can be traced easily using low power processing enclosures.

Network safety: connections and disconnection can be monitor in real time. Traffic patterns can be collected and evaluated to determine security breaches. Changes on the configuration or power can indicate the installation of a tap be monitored.

Network Reliability: the power of the laser for each connection can be monitored and predict potential failures on the system.

Network Performance: traffic Monitoring and efficient allocation of network assets in real time without the need to task all the switches of the network. The devices already are in the center of the connection for multiple switches, Therefore, there is no need to task multiple switches to capture or evaluate the traffic.

FIG. 11 shows an example for this application and a partial view of an arbitrary network architecture with two levels of switches (1110). Since a mesh network has been implemented in the device, and all connection are mapped, this is the best place to monitor the traffic, optical power, and other parameters in real time. The traffic is shown for 16 links as a function of time 1120. Current monitoring require communication among of multiple switches to produce a traffic map.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus having input and output ports using a plurality of optical connector adapters, with internal fibers connecting the input and output optical ports, where, the fiber connections can follow a specific mesh pattern comprising:
    a plurality of fibers inside the apparatus, the fibers passing through at least one mandrel, designed to produce a leakage in the transmitted light from each fiber of least-30 dBm, wherein the fiber buffer of fibers around the mandrel are partially stripped in at least one section;
    an imaging system consisting of at least a lens, camera sensor and an optical filter are placed in proximity to the fiber striped section wherein the optical filter has spectral properties tuned or partially tuned to the operational wavelength of the network and the optical filter is placed in the light path before the camera sensor; and
    electronic circuits are placed to process images from the camera and transmit them using a cable connected to the device.

2. The apparatus according to claim 1, wherein a set of mirrors are used to increase the field of view of the camera, and/or where wide field lenses are used to increase the field of view of the camera.

3. An apparatus having input and output ports using a plurality of optical connector adapters, with internal fibers connecting the input and output optical ports, comprising:
    fiber connections with the internal fibers following a specific mesh pattern wherein all the internal fibers pass through at least one mandrel, designed to produce a leakage in the transmitted light and the fiber buffer of the internal fibers around the mandrel, are partially stripped in at least one section;
    an array of LCD film placed on the top of the fibers (striped section);
    an imaging system including at least a lens, or collector device, a sensor and an optical filter are placed in proximity to the LCD film section wherein the optical filter has spectral properties tuned or partially tuned to an operational wavelength of a network and the optical filter is placed in the light path before the camera sensor; and
    electronic circuits placed to process images from the camera and transmit them using a cable connected to the device.

4. The apparatus according to claims 1 or 3 where electrical circuits are placed for image processing and/or transmission of monitoring.

5. The apparatus according claim 4, where displays, LCD, LED are placed in from of the enclosure to display the status of the links.

6. The apparatus according claim 4, where monitoring information is transmitted wireless or using a cable, fiber or copper connected to the apparatus.

7. The apparatus according to claims 1 or 3 wherein an active optical channel and the traffic are determined from DC and AC components of the signal after O/E conversion before estimation the AC are filtered using a pass band filter with center frequency near 0.75 of the baud rate.

* * * * *